United States Patent
Budaya et al.

(10) Patent No.: US 7,290,099 B2
(45) Date of Patent: Oct. 30, 2007

(54) USING PARALLELISM FOR CLEAR STATUS TRACK PROCESSING DURING ERROR HANDLING BEHAVIOR IN A STORAGE SYSTEM

(75) Inventors: Angelique R. Budaya, Tucson, AZ (US); Aaron S. Mahar, Tucson, AZ (US); James A Springer, Sr., Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 490 days.

(21) Appl. No.: 10/921,443

(22) Filed: Aug. 19, 2004

(65) Prior Publication Data
US 2006/0041780 A1 Feb. 23, 2006

(51) Int. Cl.
*G06F 12/00* (2006.01)
(52) U.S. Cl. .............. 711/157; 707/101; 711/112; 711/114
(58) Field of Classification Search ........... 711/154
See application file for complete search history.

(56) References Cited

U.S. PATENT DOCUMENTS

| 4,123,795 | A | 10/1978 | Dean, Jr. et al. |
| 4,685,125 | A * | 8/1987 | Zave ................ 700/1 |
| 5,564,011 | A | 10/1996 | Yammine et al. |
| 5,590,356 | A | 12/1996 | Gilbert |
| 5,692,193 | A | 11/1997 | Jagannathan et al. |
| 5,978,849 | A | 11/1999 | Khanna |
| 6,230,200 | B1 | 5/2001 | Forecast et al. |
| 2001/0047444 | A1 | 11/2001 | Waldie et al. |
| 2002/0040382 | A1 | 4/2002 | Ueda |
| 2003/0163507 | A1 | 8/2003 | Chang et al. |
| 2004/0055003 | A1* | 3/2004 | Sundaram et al. ........ 718/108 |

FOREIGN PATENT DOCUMENTS

JP 63128442 A 6/1988

OTHER PUBLICATIONS

Ferdinand, G.J., et al., "Cross Memory Local Storage Option", *IBM Technical Disclosure Bulletin*, vol. 24, No. 3, pp. 1486-1489 (Aug. 1981).
Liedtke, J., "A Short Note on Small Virtually-Addressed control Block", *ACM SIGOPS Operating Systems Review*, vol. 29, Issue 3, pp. 31-34 (Jul. 1995).

* cited by examiner

*Primary Examiner*—Brian R. Peugh
*Assistant Examiner*—Hashem Farrokh
(74) *Attorney, Agent, or Firm*—Scully, Scott, Murphy & Presser, P.C.

(57) ABSTRACT

Tracks of meta data are cleared in a storage server by allocating task control blocks for executing associated tasks in parallel. Throttling and recycling of task control blocks is provided to efficiently use memory and processing resources. Under the control of a master task, task control blocks are allocated to different hierarchical levels of storage resources in the storage server, such as a logical subsystem level and a subordinate volume level. The task control blocks are not deallocated from memory until there are no further tasks to process.

24 Claims, 7 Drawing Sheets

USING PARALLELISM FOR CLEAR STATUS TRACK PROCESSING DURING ERROR HANDLING BEHAVIOR IN A STORAGE SYSTEM

BACKGROUND OF THE INVENTION

1. Field of the Invention

The invention relates generally to the field of computer systems and, more specifically, to a technique for efficiently clearing meta data in a storage system when an error occurs.

2. Description of the Related Art

Computer storage devices such as storage servers have high-capacity disk arrays to backup data from external host systems, such as host servers. For example, a large corporation or other enterprise may have a network of servers that each store data for a number of workstations used by individual employees. Periodically, the data on the host servers is backed up to the high-capacity storage server to avoid data loss if the host servers malfunction. A storage server may also backup data from another storage server, such as at a remote site. The storage servers are known to employ redundant systems to provide additional safeguards against data loss. The IBM Enterprise Storage Server (ESS) is an example of such a storage server.

Moreover, meta data such as server system control data is often associated with the storage resources. It is necessary to clear the meta data on occasion such as when an error occurs in the storage system. However, a performance problem can result when clearing the meta data due to the required allocation of processing and memory resources.

BRIEF SUMMARY OF THE INVENTION

To address the above and other issues, the present invention provides a method and system for clearing meta data associated with storage resources in a data storage system.

In one aspect of the invention, a method for clearing meta data in a data storage system includes determining a number N of task control blocks to be used for implementing a plurality of tasks for clearing the meta data. The meta data is provided in tracks that are associated with the storage resources, and the storage resources are arranged in a hierarchy including at least a first level and a lower second level. The method further includes implementing the tasks by allocating a first subset of the N task control blocks, comprising a first plurality of the task control blocks, for first tasks for clearing first tracks of the meta data that are associated with the first level, and allocating a second subset of the N task control blocks, comprising a second plurality of the task control blocks, for second tasks for clearing second tracks of the meta data that are associated with the second level.

In another aspect of the invention, a method for clearing meta data in a data storage system includes allocating task control blocks in a memory resource in the data storage system for implementing a first plurality of tasks for clearing the meta data in a second plurality of meta data tracks. The first plurality is less than the second plurality, and the second plurality of meta data tracks are associated with a plurality of different hierarchical levels of storage resources in the data storage system. The method further includes implementing throttling and recycling of the task control blocks at the different hierarchical levels to implement the first plurality of tasks.

In yet another aspect of the invention, a method for clearing meta data in a data storage system includes determining a number N of task control blocks to be used for implementing a plurality of tasks for clearing the meta data. The meta data is provided in tracks that are associated with the storage resources, and the storage resources are arranged in a hierarchy including at least a first level and a lower second level. The method further includes implementing the tasks by allocating a first subset of the N task control blocks, comprising a first plurality of the task control blocks, for first tasks for clearing first tracks of the meta data that are associated with the first level, and allocating a second subset of the N task control blocks, comprising a second plurality of the task control blocks, for second tasks for clearing second tracks of the meta data that are associated with the second level. The method further includes allocating at least a first additional one of the N task control blocks for implementing a first master task for coordinating the allocating of the first subset of the N task control blocks, and reusing of the first task control blocks as initial ones of the first tasks are completed to implement subsequent ones of the first tasks, and allocating at least a second additional one of the N task control blocks for implementing a second master task for coordinating the allocating of the second subset of the N task control blocks, and reusing of the second task control blocks as initial ones of the second tasks are completed to implement subsequent ones of the second tasks.

Corresponding data storage systems and program storage devices are also provided.

BRIEF DESCRIPTION OF THE DRAWINGS

These and other features, benefits and advantages of the present invention will become apparent by reference to the following text and figures, with like reference numbers referring to like structures across the views, wherein.

DETAILED DESCRIPTION OF THE INVENTION

Figure 1:
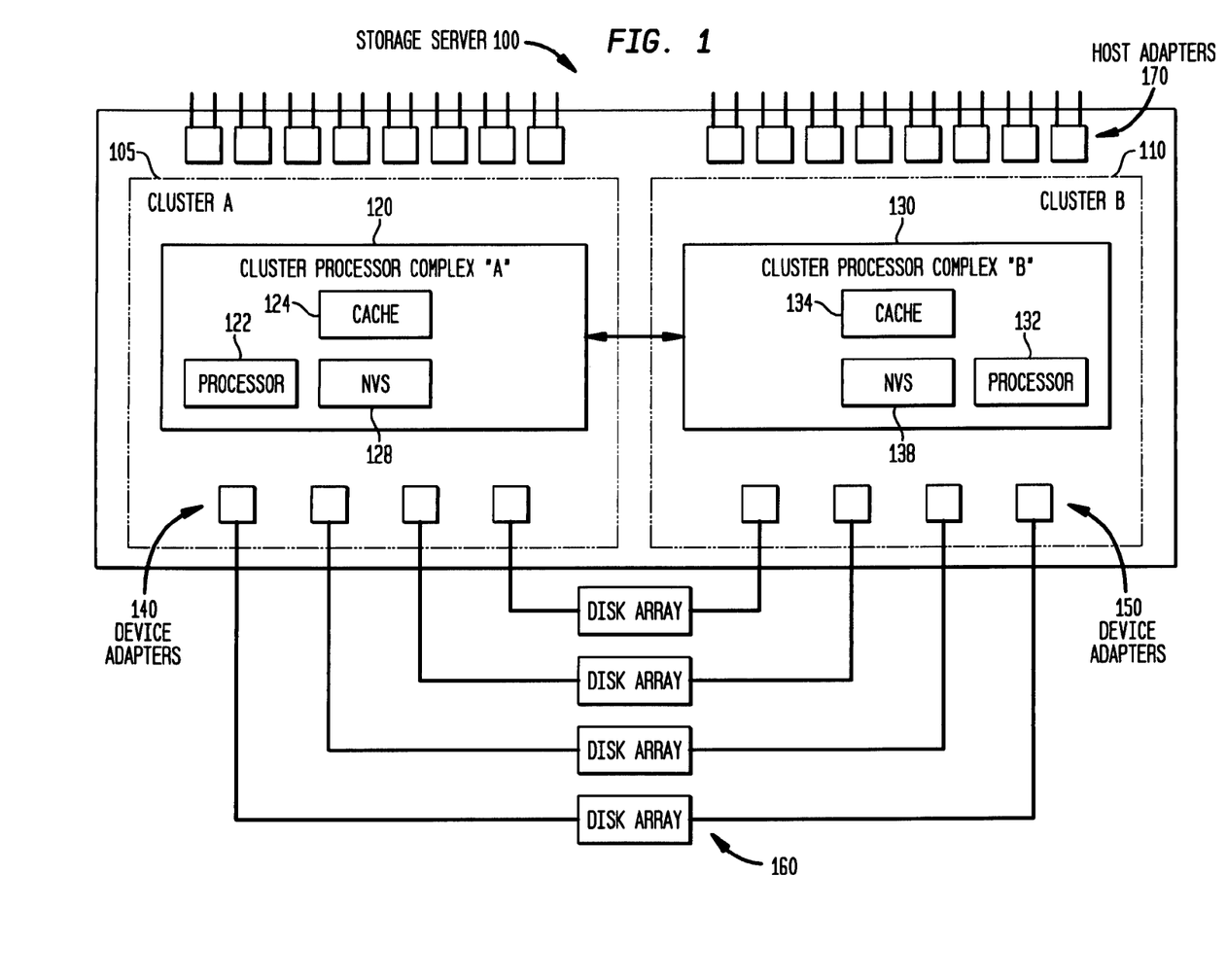
FIG. 1 illustrates an overview of a logical structure of a dual cluster storage server.

FIG. 1 illustrates an overview of a logical structure of a dual cluster storage server. A storage server 100, which may an IBM Enterprise Storage Server (ESS), for instance, is a high-capacity storage device that can back up data from a variety of different devices. For example, a large corporation or other enterprise may have a network of servers that each store data for a number of workstations used by individual employees. Periodically, the data on the host servers is backed up to the high-capacity storage server 100 to avoid data loss if the host servers malfunction. The storage server 100 can also provide data sharing between host servers since it is accessible to each host server. The storage server 100 itself has redundant storage resources to provide an additional safeguard against data loss. As a further measure, the data of the storage server 100 may be mirrored to another storage server, typically at a remote site. A storage server of a particular type, such as one that uses disk storage, may connect to one or more other peer disk storage servers as well as to other storage devices, such as those using magnetic tape. A user interface may be provided to allow a user to access information regarding the status of the storage server 100.

The example storage server 100 includes two clusters for redundancy. Each cluster 105, 110, e.g., "A" and "B", respectively, works independently, and may include cluster processor complexes 120, 130 with cluster cache 124, 134, nonvolatile storage (NVS) 128, 138, and device adapters 140, 150. The device adapters (DA) 140, 150 are used to connect the disks 160 to the cluster processor complexes 120, 130. Each cluster 105, 110 contains four device adapters 140, 150. Each adapter is part of a pair, one on each cluster. A pair supports two independent paths to all of the disk drives served by the pair. Each disk array is configured to be accessed by only one of the clusters. However, if a cluster failure occurs, the surviving cluster automatically takes over all of the disks. The disk arrays or ranks 160 can be configured as RAID 5 (redundant array of independent disks) or non-RAID arrays. Alternatively, another high-capacity storage medium may be used. The disk arrays 160 are examples of storage resources that are arranged hierarchically, as discussed further below.

Processors 122 and 132 execute instructions such as software, firmware and/or microcode, stored in the respective cluster, such as in a region of the respective cache that is preserved during a reboot, or in a separate non-volatile memory, to achieve the functionality described herein.

Host adapters (HAs) 170 are external interfaces that may support two ports, e.g., either small computer systems interface (SCSI) or IBM's enterprise systems connection (ESCON), which is an Enterprise Systems Architecture/390 and zSeries computer peripheral interface. This I/O interface uses ESA/390 logical protocols over a serial interface that configures attached units to a communication fabric. For example, a remote storage server, host servers and a user interface may communicate with the storage server 100 via the HAs. Fibre channel or fibre-channel connection (FI-CON) has support for one channel per HA. Each HA connects to both cluster processor complexes 120, 130 so that either cluster can handle I/Os from any host adapter. A system adapter identification number (SAID) is a unique identification number automatically assigned to each HA. The storage server 100 contains four host-adaptor bays, each of which is connected to both clusters 105, 110 for redundancy.

Figure 2:
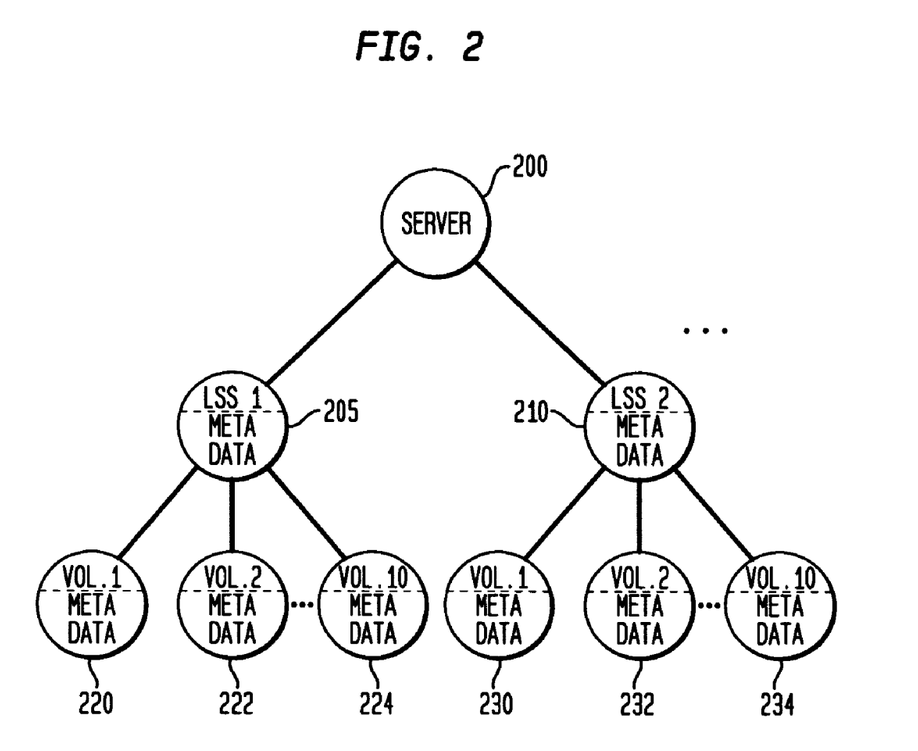
FIG. 2 illustrates a hierarchy of storage resources and associated meta data.

FIG. 2 illustrates a hierarchy of storage resources and associated meta data. The storage resources in the storage server 100 may be arranged hierarchically. In one possible approach, the device level is at the first, highest level of the hierarchy. The device level may include the storage server 100. The second level represents storage resources within a specific device. For example, the storage server 100 may have logical subsystems (LSSs), which in turn are comprised of volumes, in the third level of the hierarchy. The LSS is a topological construct that includes a group of logical devices such as logical volumes, which may be units of recording medium associated with a logical disk drive. For example, a logical volume in a RAID array may be spread over the disks in the array. The units may include sectors of one or more disks. Furthermore, meta data such as server system control data may be provided in tracks that are part of the disk drives in a designated area of the disks. Meta data is typically provided for each of the subcomponents of the storage server, such as cache, device adapter, copy services, hardware, etc. There may also be different types of meta data for a single subcomponent. For example, the Copy Services subcomponent may include Global Meta Data and Segment Meta Data.

In the example hierarchy, the server level 200 is at the highest level. The LSSs, such as LSSs 205 and 210, are at the next level. The volumes, such as vol. 1 (220), vol. 2 (222), . . . , vol. 10 (224) under LSS 1 (205), and vol. 1 (230), vol. 2 (232), . . . , vol. 10 (234) under LSS 2 (210), are at the next, and lowest, level. The meta data for each of the storage resources is also indicated. Of course, other arrangements are possible. For example there may be more than, or fewer than, three hierarchical levels. Also, note that there are usually more LSSs and volumes than what is shown in the simplified example of FIG. 2.

As mentioned, the tracks of meta data must be cleared at various times, such as when there is an error in the storage server 100. In this case, the meta data is cleared because the server is reset and the meta data will no longer be valid. The meta data tracks may relate to copy services that are performed by the server 100, such as the peer-to-peer or point-in-time copying mentioned previously. As indicated in FIG. 2, these tracks are designed to have an affinity at the server or box level, the LSS level, and the volume level. Volume level tracks also have an LSS affinity since volumes are owned by a particular LSS.

The meta data tracks may be cleared in a process referred to as Clear Status Tracks (CST). Specifically, CST is an operation that comes through the storage server's operating system (OS subcomponent). OS has the responsibility of notifying all other subcomponents (Cache, Device Adapters, Copy Services, etc.) that CST has been issued. It does this by setting a flag. All subcomponents check this OS flag to determine if CST work is needed for their subcomponent. If so, the CST processing is triggered. During CST processing, all meta data tracks are cleared. When the CST command is issued, all LSSs and volumes must have their meta data cleared. Specifically, when it is discovered, e.g., by querying another component, that the CST has been issued, a flag or bit in memory may be set for every LSS and every volume on the storage server 100 for which CST is needed. The flags/bits may be organized into an array-like data structure for the flags or a bitmap, e.g., an array of bits, where the index into the array represents the identifier (ID) of the LSS or volume. The identifiers may be sequential numbers, for example. As discussed further below, a counter may use these in-memory arrays to find the next LSS or volume. The flags/bits are cleared when the CST has completed for the LSS or volume.

CST processing should complete before the end of initial microcode load (IML), when microcode is loaded into the caches 124 and 134 to re-start the storage server 100. Because there are a large number of meta data tracks, clearing the tracks serially, one after another, may introduce a performance problem due to the processing and memory requirements. This problem can be addressed by parallelism. To achieve parallelism, at least one Task Control Block (TCB) can be used for each level. The TCB is a location in memory that stores some contextual information about the task it is executing, where the task involves clearing meta data such as in a meta data track. The LSS level will require more than one TCB because it can further be subdivided into a global meta data level and a volume meta data level. Each task can be used to delete the meta data of a given storage resource, such as an LSS or volume. Moreover, it is possible that a TCB can clear more than one meta data track at a time, but this has to be done serially, one track at a time.

However, the storage server 100 has a limited number of TCBs that can be allocated for clearing meta data because of memory and processing limitations. That is, memory and processing resources must be available for other processes on the storage server 100 besides clearing meta data. Thus, it is necessary to control the use of TCBs so as not to exceed a maximum limit, which can be set by the storage system designer. The invention improves CST performance by using parallelism, while at the same time throttling and recycling TCBs using a set number of tasks. In particular, throttling is implemented for a set number of tasks using a task counter and recycling of task control blocks to postpone block deallocation from memory and improve task performance and overhead. Moreover, it provides a mechanism for the parallel tasks to divide up the work and to recognize when all the work is complete. Unlike other throttling mechanisms, the CST process is for use with a finite number of tasks. In addition, it reduces the overhead of allocating and deallocating task control blocks for each task. All the necessary TCBs are allocated once, reused as a task completes and a new task must be executed, and deallocated when no other new tasks are necessary.

Multiple task counters may be implemented to track progress of the task control blocks. A first counter will represent the identifier (ID) of the next LSS TCB that needs to be executed. For each LSS, we will also implement a second counter to track volume level clearing tasks. This counter will represent the ID of the next volume TCB that needs to be executed for its owning LSS. Moreover, a master, or control, TCB may be implemented to coordinate the allocation and recycling of TCBs for the clearing tasks. For LSS-level TCB allocation, this master TCB will be the main driving TCB for the clearing function. For volume-level TCB allocation, the master TCB will be the LSS TCB allocated by the main driving TCB.

Figure 3:
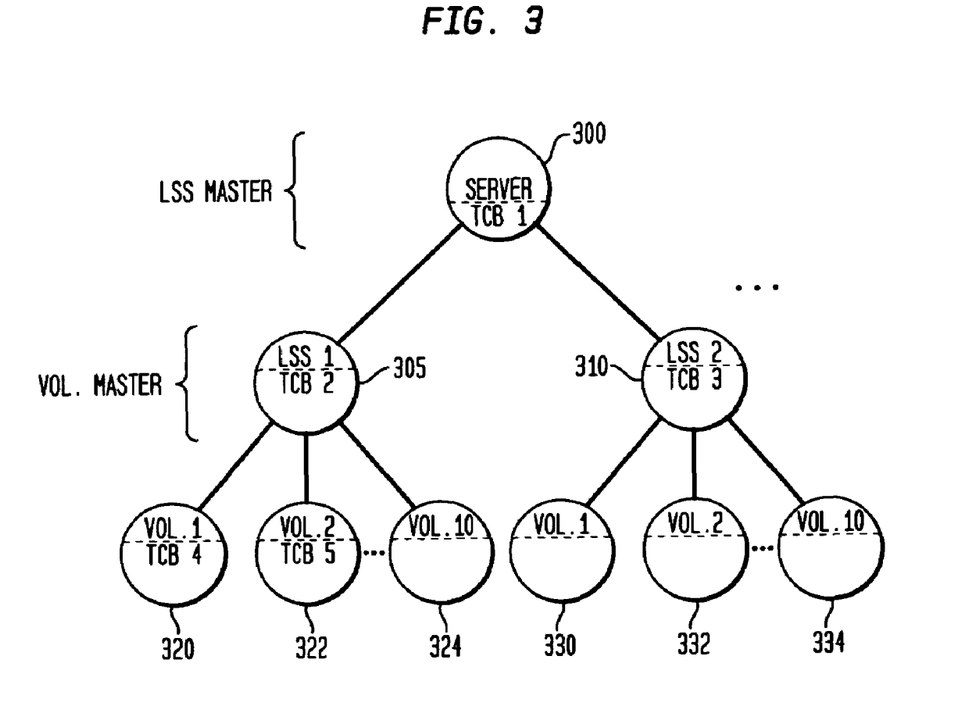
FIG. 3 illustrates an allocation of task control blocks to the storage resources of FIG. 2.

An overview of the allocation of TCBs to the storage resources of FIG. 2 is illustrated in FIG. 3. For example, assume there are a total of ten TCBs allocated at all levels—three at the LSS level, and seven at the volume level. In practice, the number of TCBs is likely to be larger. At the server level 300, a first TCB (TCB 1) is the LSS master TCB, which controls the allocation of TCBs at the LSS level, which includes LSS 1 (305) and LSS 2 (310). TCB 1 allocates the next available TCB, TCB 2, to LSS 1 (305), and the next subsequent available TCB, TCB 3, to LSS 2 (310). At the LSS level, TCB 1 controls allocation of TCBs at the volume level and in this way acts as the volume master. The same is true for TCB 2. Under LSS 1 (305), the volumes include vol. 1 (320), vol. 2 (322), . . . , vol. 10 (324). Under LSS 2 (310), the volumes include vol. 1 (330), vol. 2 (332), . . . , vol. 10 (334). TCB 2 allocates the next available TCBs as follows: TCB 4 is allocated to vol. 1 (320), TCB 5 is allocated to vol. 2 (322), and TCBs 6-13 are allocated to volumes 3-10, respectively, under LSS 1 (305).

Whenever a meta data clearing task associated with a TCB at the LSS level completes executing, the TCB can be reused for a next LSS. Similarly, whenever a meta data clearing task associated with a TCB at the volume level completes executing, the TCB can be reused for a next volume. For example, when TCB 5 has completed the task for clearing the meta data of vol. 1 (320), this TCB may be allocated by the volume master TCB to the next volume, e.g., volume 7, under LSS 1 (305). If all tasks at a given level of the storage resources have completed, the associated TCBs may be re-assigned to another level. This is true because all such TCBs were deallocated and became free for allocation by the next TCB resource request. For example, if all tasks at the LSS level have completed, the associated TCBs may be re-assigned to the volume level.

Generally, one TCB can be allocated at a time in order to wait for a status to determine if each allocation request was successful. This allows us to know when all available TCBs in the whole system have been allocated and there are no more available for use. However, as many TCBs can be allocated as desired in a single processing loop, as indicated in the following pseudo code.

```
while (numAllocated < MAX_ALLOCATION_PER_LSS/VOL) {
    allocate TCB
    if (newly allocated TCB is not valid - i.e. there are no more
    available TCBs in the
            system to use)
        invoke some service for handling this situation that will
        break out of this loop
    else
        initialize/set up TCB
        dispatch TCB
        increment numAllocated
}
```

When a TCB completes its task, it may follow this algorithm:

```
Try to find another LSS/volume that needs to be cleared
If one is found
    re-initialize TCB properties
    //<-This is when the TCB is being recycled for use on a
            // different LSS/volume
    re-dispatch TCB
Else there are no other LSSs/volumes that need clearing
    free/deallocate TCB If this is the last TCB that has finished
        Invoke completion notification service
```

Figure 4:
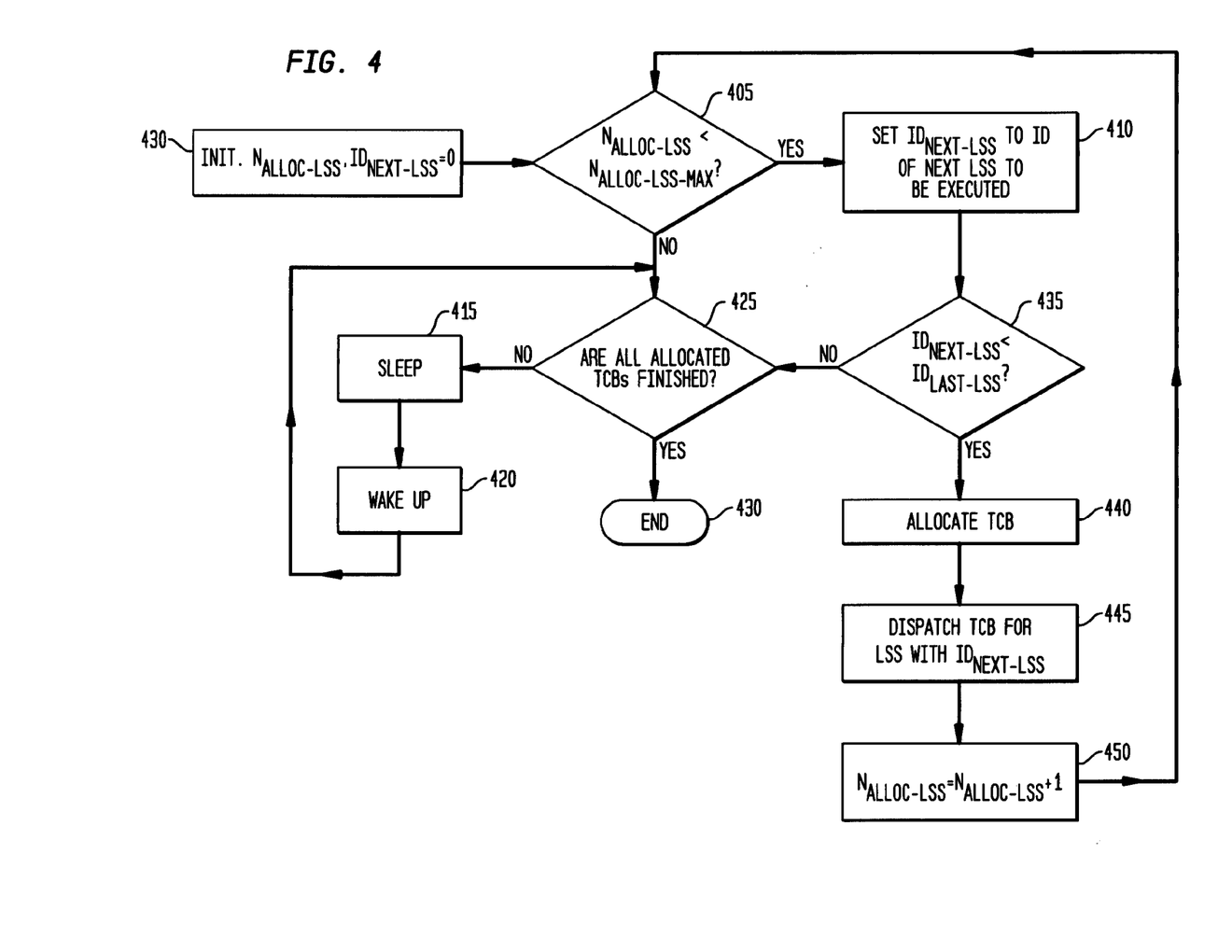
FIG. 4 illustrates a master task allocation algorithm for allocating tasks for clearing meta data for a logical subsystem (LSS)

FIG. 4 illustrates a master task allocation algorithm for allocating tasks for clearing meta data for an LSS. An analogous process occurs for clearing volume meta data (see FIGS. 6 and 7). $N_{ALLOC\text{-}LSS\text{-}MAX}$ is the maximum number of TCBs that may be allocated for running tasks for clearing meta data for LSSs. $N_{ALLOC\text{-}LSS}$ is the number of TCBs currently allocated for running tasks for clearing meta data for LSSs. $ID_{NEXT\text{-}LSS}$ is an identifier of a next LSS whose meta data is to be cleared. $ID_{LAST\text{-}LSS}$ is an identifier of a last LSS whose meta data is to be cleared.

At block 400, $N_{ALLOC\text{-}LSS}$ and $ID_{NEXT\text{-}LSS}$ are initialized to zero. At block 405, it is determined whether $N_{ALLOC\text{-}LSS}$ is less than $N_{ALLOC\text{-}LSS\text{-}MAX}$. If so, the number of TCBs allocated has not reached the maximum number. At block 410, we search for the ID of the next configured LSS to be cleared, e.g., by setting $ID_{NEXT\text{-}LSS}$ to the ID of the next LSS for which a CST process is be executed. $ID_{NEXT\text{-}LSS}$ is essentially a counter for tracking a progress of the LSS tasks by identifying a next storage resource in the LSS level of the hierarchy for which the associated track of meta data is to be cleared. As $ID_{NEXT\text{-}LSS}$ increases toward $ID_{LAST\text{-}LSS}$, the number of LSS tasks remaining decreases. At block 435, if $ID_{NEXT\text{-}LSS} < ID_{LAST\text{-}LSS}$, there are additional LSSs remaining whose meta data is to be cleared. This assumes identifiers are assigned to the LSSs starting, e.g., at one for the first LSS, and incrementing toward higher numbers until $ID_{LAST\text{-}LSS}$ is reached. If there are additional LSSs remaining whose meta data is to be cleared, an available TCB is allocated at block 440, and, at block 445, the "worker" TCB is dispatched for task execution in clearing the LSS meta data for the LSS having the identifier $ID_{NEXT-LSS}$. At block 450, the number of allocated LSS TCBs, $N_{ALLOC-LSS}$, is then incremented.

Figure 5:
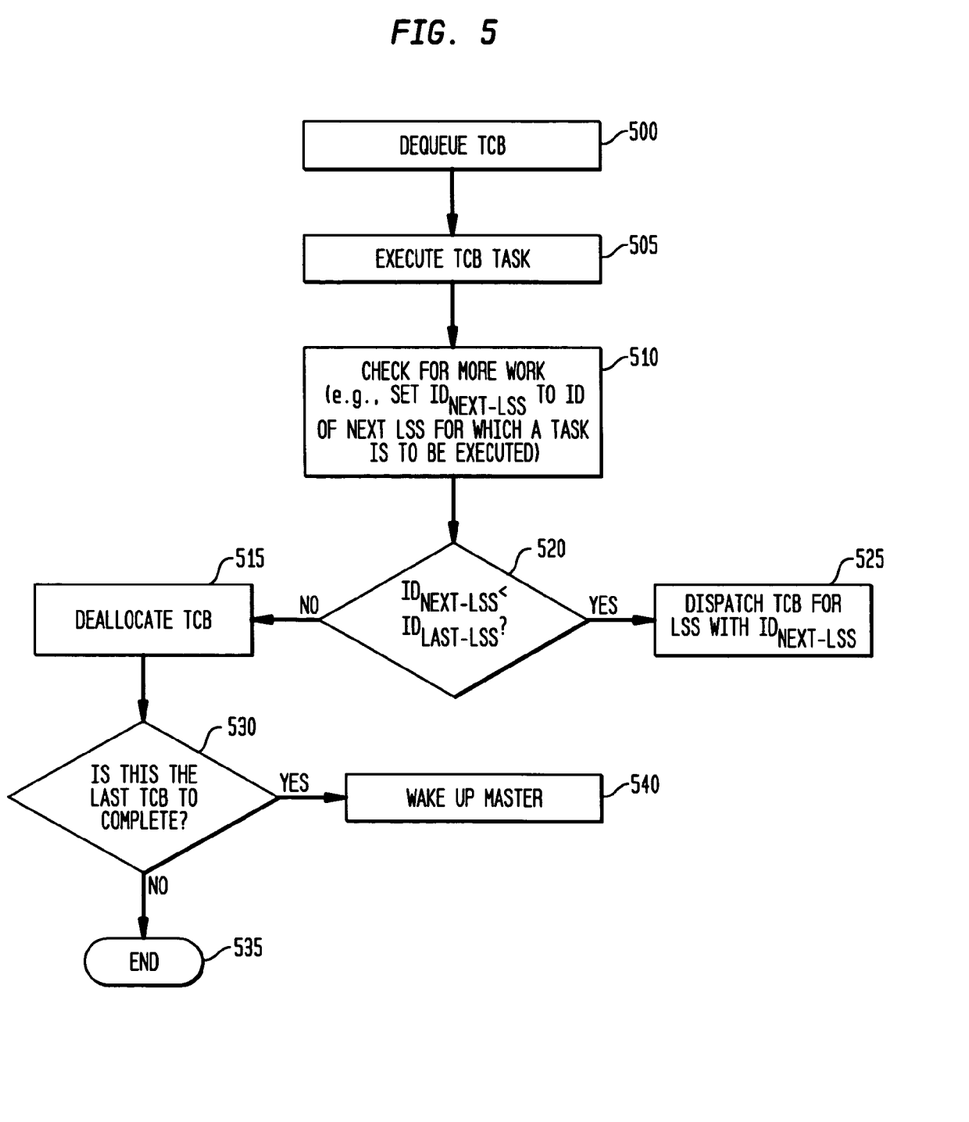
FIG. 5 illustrates processing of a task control block (TCB) for an LSS when it is executed.

Processing then continues at block 405. Once the maximum number of LSS TCBs has been allocated, as determined at block 405, a determination is made, at block 425, as to whether all allocated TCBs are finished, that is, whether the associated task has finished clearing the meta data. If they are finished, the process ends, at block 430. If all tasks are not finished, the master LSS TCB stops and waits until a task completes. This last task has the responsibility of waking up the master LSS TCB. Specifically, if all TCBs are not finished, a sleep or wait period occurs at block 415, followed by a wake up at block 420. The wake up is performed by the last task (FIG. 5, block 540). Another check is then made, at block 425, to determine whether all allocated TCBs are finished.

The above approach represents the algorithm used to allocate LSS TCBs or volume-master tasks. The LSS TCB/volume-master task will allocate one TCB, a global meta data worker TCB, to handle global meta data tracks first. Then the LSS/volume-master task will use this same algorithm to allocate volume tasks, or volume worker TCBs. When a global meta data worker TCB completes, it deallocates itself and determines if it should wake up the LSS/volume-master task. It will do so only if all volume worker TCBs have all completed. When a volume worker TCB completes, it determines if there is a volume still needing CST. If so, the volume worker TCB is reused for this pending volume. If all volume level CST has finished for the LSS, the TCB can be deallocated. If the volume worker is the last TCB allocated by the LSS/volume-master task to finish and deallocate, then the LSS/volume-master task is called back and awakened so the LSS/volume-master task can finish processing.

If the ID represented by the task counter is less than the maximum ID value for an LSS or a volume, the LSS/volume-master TCB searches for the next configured LSS (or volume worker TCB searches for next volume) still needing to be cleared. If one is found, the TCB will then assign this ID to itself and to the task counter. The modified TCB is then dispatched to perform clearing tasks for the "new" ID. If an ID is not found, then there are no more tasks required and the TCB is freed. All other TCBs that subsequently finish will also be freed since an ID will no longer be found and all remaining tasks have been started.

FIG. 5 illustrates processing of a task control block (TCB) for an LSS when it is executed. When a TCB is dispatched, it is added to a ready queue for task execution. At block 500, the TCB that is associated with a task that is to be executed next is dequeued, which means it is removed from the ready queue. At block 505, the associated TCB task is executed to clear meta data. At block 510, a check is made to determine if there is more work for the TCB. $ID_{NEXT-LSS}$ is set to the identifier of the next LSS for which a task is to be executed. At block 520, if $ID_{NEXT-LSS} < ID_{LAST-LSS}$, there are additional LSSs remaining whose meta data is to be cleared. In this case, at block 525, a "worker" TCB is dispatched for task execution in clearing the LSS meta data track for the LSS having the identifier $ID_{NEXT-LSS}$. If there are no additional LSSs remaining whose meta data is to be cleared, the TCB is deallocated at block 515. This means the memory resource which had been allocated to the TCB is freed for other uses. At block 530, if the current TCB is the last TCB to complete, the LSS master task is woken up at block 540. If the current TCB is not the last TCB to complete, the process ends at block 535. The master volume task (e.g., the LSS TCB) sleeps until the last master volume worker task wakes it up. When this master volume task wakes up, it checks to see if there are more LSSs to process. If there are none, and it is the last task to be done, then it wakes up the master LSS task (e.g., the overall server task). When the server task wakes up, the CST process is complete.

Volume tasks will follow the above approach as well to find work or determine when the volume master task must be awakened. Volume master tasks will follow this approach to find work or determine when the LSS Master (i.e. server level) task must be awakened.

Figure 6:
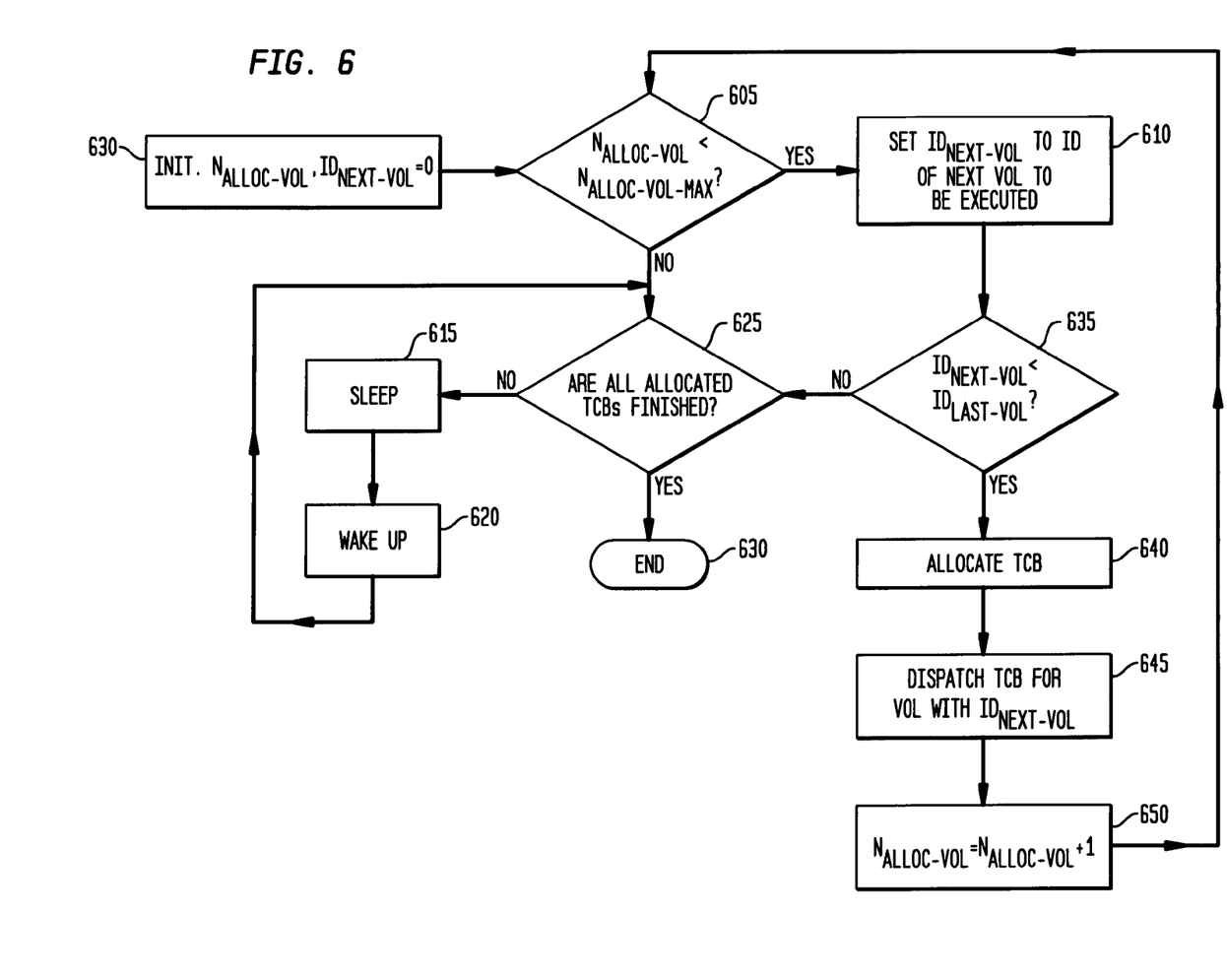
FIG. 6 illustrates a master task allocation algorithm for allocating tasks for clearing meta data for a volume.

FIG. 6 illustrates a master task allocation algorithm for allocating tasks for clearing meta data for a volume. $N_{ALLOC-VOL.-MAX}$ is the maximum number of TCBs that may be allocated for running tasks for clearing meta data for volumes. $N_{ALLOC-VOL.}$ is the number of TCBs currently allocated for running tasks for clearing meta data for volumes. $ID_{NEXT-VOL.}$ is an identifier of a next volume whose meta data is to be cleared. $ID_{LAST-VOL.}$ is an identifier of a last volume whose meta data is to be cleared.

Figure 7:
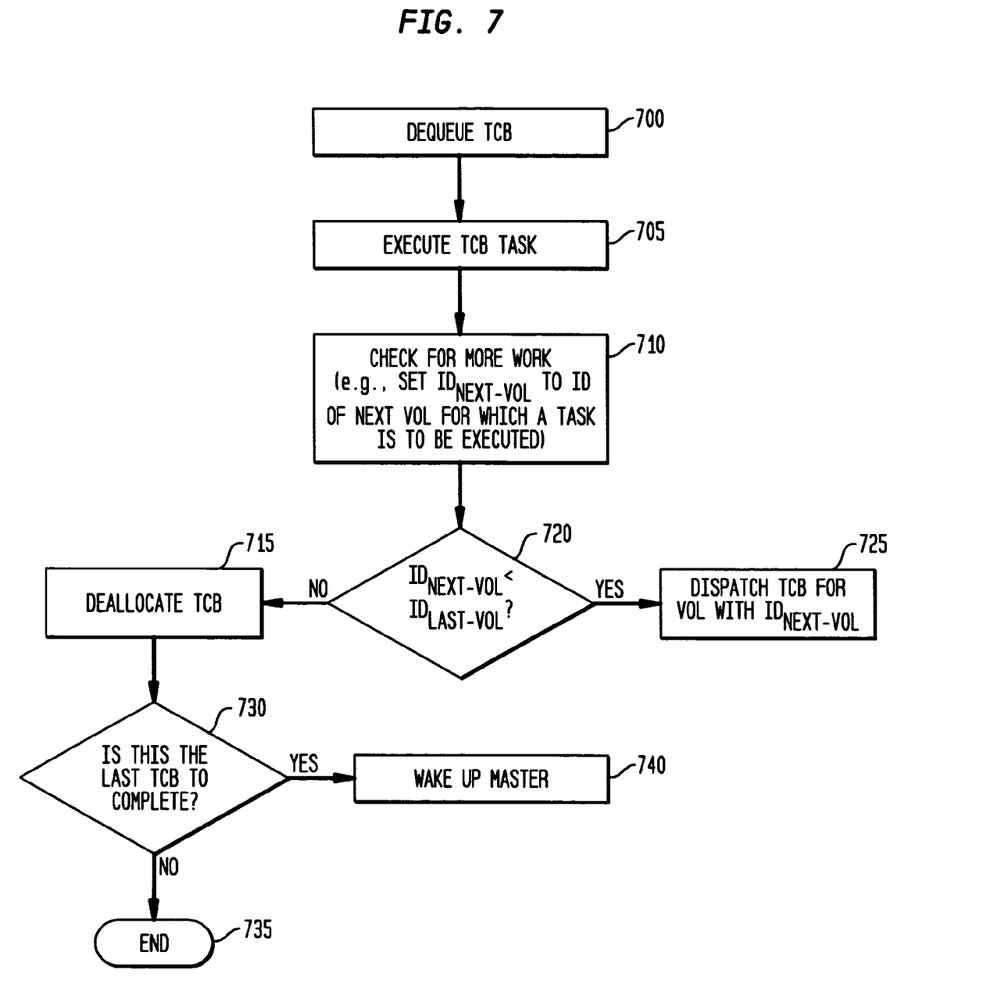
FIG. 7 illustrates processing of a task control block (TCB) for a volume when it is executed.

At block 600, $N_{ALLOC-VOL.}$ and $ID_{NEXT-VOL.}$ are initialized to zero. At block 605, it is determined whether $N_{ALLOC-VOL.}$ is less than $N_{ALLOC-VOL.-MAX}$. If so, the number of TCBs allocated has not reached the maximum number. At block 610, we search for the ID of the next configured volume to be cleared, e.g., by setting $ID_{NEXT-VOL.}$ to the ID of the next volume for which a CST process is be executed. $ID_{NEXT-VOL.}$ is essentially a counter for tracking a progress of the volume tasks by identifying a next storage resource in the volume level of the hierarchy for which the associated track of meta data is to be cleared. As $ID_{NEXT-VOL.}$ increases toward $ID_{LAST-VOL.}$, the number of volume tasks remaining decreases. At block 635, if $ID_{NEXT-VOL.} < ID_{LAST-VOL.}$, there are additional volumes remaining whose meta data is to be cleared. This assumes identifiers are assigned to the volumes starting, e.g., at one for the first volume, and incrementing toward higher numbers until $ID_{LAST-VOL.}$ is reached. If there are additional volumes remaining whose meta data is to be cleared, an available TCB is allocated at block 640, and, at block 645, the "worker" TCB is dispatched for task execution in clearing the volume meta data track for the volume having the identifier $ID_{NEXT-VOL.}$. At block 650, the number of allocated volume TCBs, $N_{ALLOC-VOL.}$, is then incremented. Processing then continues at block 605. Once the maximum number of volume TCBs has been allocated, as determined at block 605, a determination is made, at block 625, as to whether all allocated TCBs are finished, that is, whether the associated task has finished clearing the meta data. If they are finished, the process ends, at block 630. If all tasks are not finished, the master volume TCB stops and waits until a task completes. The last task to complete has the responsibility of waking up the master volume TCB. Specifically, if all TCBs are not finished, a sleep or wait period occurs at block 615, followed by a wake up at block 620. The wake up is performed by the last task (FIG. 7, block 740). Another check is then made, at block 625, to determine whether all allocated TCBs are finished.

FIG. 7 illustrates processing of a task control block (TCB) for a volume when it is executed. When a TCB is dispatched, it is added to a ready queue for task execution. At block 700, the TCB that is associated with a task that is to be executed next is dequeued. At block 705, the associated TCB task is executed to clear meta data. At block 710, a check is made to determine if there is more work for the TCB. $ID_{NEXT-VOL.}$ is set to the identifier of the next volume for which a task is to be executed. At block 720, if $ID_{NEXT-VOL.} < ID_{LAST-VOL.}$, there are additional volumes remaining whose meta data is to be cleared. In this case, at block 725, a "worker" TCB is dispatched for task execution in clearing the volume meta data track for the volume having the identifier $ID_{NEXT-VOL.}$. If there are no additional volumes remaining whose meta data is to be cleared, the TCB is deallocated at block 715. This means the memory resource that had been allocated to the TCB is freed for other uses. At block 730, if the current TCB is the last TCB to complete, the master task is woken up at block 740. If the current TCB is not the last TCB to complete, the process ends at block 735. The master volume task (e.g., the LSS level TCB) sleeps until the last volume worker task wakes it up. When this master volume task wakes up, it checks to see if there are more volumes to process. If there are none, and it is the last task to be done, then it wakes up the master LSS task (e.g., the overall server task). When the server task wakes up, the CST process is complete.

The invention has been described herein with reference to particular exemplary embodiments. Certain alterations and modifications may be apparent to those skilled in the art, without departing from the scope of the invention. The exemplary embodiments are meant to be illustrative, not limiting of the scope of the invention, which is defined by the appended claims.

What is claimed is:

1. A method for clearing meta data in a data storage system, comprising:
   determining a number N of task control blocks to be used for implementing a plurality of tasks for clearing the meta data;
   wherein the meta data is provided in tracks that are associated with the storage resources, and the storage resources are arranged in a hierarchy including at least a first level and a lower second level; and
   implementing the tasks by allocating a first subset of the N task control blocks, comprising a first plurality of the task control blocks, for first tasks for clearing first tracks of the meta data that are associated with the first level, and allocating a second subset of the N task control blocks, comprising a second plurality of the task control blocks, for second tasks for clearing second tracks of the meta data that are associated with the second level;
   wherein said first and second allocated subsets clear the first tracks of the meta data at the at least first level and the second tracks of the meta data at the lower second level of the storage resources.

2. The method of claim 1, further comprising:
   reusing the first task control blocks as initial ones of the first tasks are completed to implement subsequent ones of the first tasks; and
   reusing the second task control blocks as initial ones of the second tasks are completed to implement subsequent ones of the second tasks.

3. The method of claim 2, further comprising:
   de-allocating task control blocks in the first subset of the N task control blocks only after they are no longer need for re-use; and
   de-allocating task control blocks in the second subset of the N task control blocks only after all they are no longer need for re-use.

4. The method of claim 1, further comprising:
   maintaining a first counter for tracking a progress of the first tasks, and a second counter for tracking a progress of the second tasks.

5. The method of claim 4, wherein:
   the first counter identifies a next storage resource in the first level for which the associated first track of meta data is to be cleared; and
   the second counter identifies a next storage resource in the second level for which the associated second track of meta data is to be cleared.

6. The method of claim 1, wherein:
   the first level of the storage resources comprises at least one logical subsystem, and the second level of the storage resources comprises a plurality of volumes associated with the at least one logical subsystem.

7. The method of claim 1, further comprising:
   allocating at least a first additional one of the N task control blocks for implementing a first master task for coordinating the allocating of the first subset of the N task control blocks; and
   allocating at least a second additional one of the N task control blocks for implementing a second master task for coordinating the allocating of the second subset of the N task control blocks.

8. The method of claim 7, wherein:
   the first master task coordinates reusing of the first task control blocks as initial ones of the first tasks are completed to implement subsequent ones of the first tasks, and the second master task coordinates reusing of the second task control blocks as initial ones of the second tasks are completed to implement subsequent ones of the second tasks.

9. The method of claim 1, wherein:
   the first and second tasks are implemented in parallel.

10. The method of claim 1, wherein:
    the N task control blocks comprise respective blocks of a memory resource.

11. The method of claim 1, wherein:
    the storage resources comprise disks, and the meta data is provided in tracks of the disks.

12. A data storage system, comprising:
    a memory resource for storing software instructions; and
    a processing resource associated with the memory for executing the software instructions for:
    determining a number N of task control Hocks to be used for implementing a plurality of tasks for clearing the meta data;
    wherein the meta data is provided in tracks that are associated with the storage resources, and the storage resources are arranged in a hierarchy including at least a first level and a lower second level; and
    implementing the tasks by allocating a first subset of the N task control blocks, comprising a first plurality of the task control blocks, for first tasks for clearing first tracks of the meta data that are associated with the first level, and allocating a second subset of the N task control blocks, comprising a second plurality of the task control blocks, for second tasks for clearing second tracks of the meta data that are associated with the second level;
    wherein said first and second allocated subsets clear the first tracks of the meta data at the first level and second tracks of the meta data at the second level of the storage resources.

13. A program storage device, tangibly embodying a program of instructions executable by a processing resource in a data storage system to perform a method for clearing meta data in the data storage system, the method comprising:

determining a number N of task control blocks to be used
for implementing a plurality of tasks for clearing the
meta data;
wherein the meta data is provided in tracks that are
associated with the storage resources, and the storage
resources are arranged in a hierarchy including at least
a first level and a lower second level; and
implementing the tasks by allocating a first subset of the
N task control blocks, comprising a first plurality of the
task control blocks, for first tasks for clearing first
tracks of the meta data that are associated with the first
level, and allocating a second subset of the N task
control blocks, comprising a second plurality of the
task control blocks, for second tasks for clearing second tracks of the meta data that are associated with the
second level;
wherein said first and second allocated subsets clear the
first tracks of the meta data associated with the fist level
and the second tracks of the meta data associated with
the second level of the storage resources.

14. A method for clearing meta data in a data storage system, comprising:
allocating task control blocks in a memory resource in the
data storage system for implementing a fist plurality of
tasks for clearing the meta data in a second plurality of
meta data tracks;
wherein the fist plurality is less than the second plurality,
and the second plurality of meta data tracks are associated with a plurality of different hierarchical levels of
storage resources in the data storage system;
implementing throttling and recycling of the task control
blocks at the different hierarchical levels to implement
the first plurality of tasks and clearing the meta data
from the second plurality of meta data tracks.

15. The method of claim 14, wherein:
the task control blocks are allocated among the different
hierarchical levels.

16. The method of claim 14, wherein:
the first plurality of tasks are implemented in parallel.

17. The method of claim 14, wherein:
allocating task control blocks in the memory resource for
implementing a respective master task for each of the
respective different hierarchical levels for coordinating
the implementing of the throttling and recycling of the
task control blocks at the respective different hierarchical levels.

18. The method of claim 14, wherein:
maintaining respective counters for tracking a progress of
the first plurality of tasks for clearing the meta data
tracks in the respective different hierarchical levels.

19. The method of claim 18, wherein:
the respective counters identify a next storage resource in
each of the respective different hierarchical levels for
which the associated meta data track is to be cleared.

20. A data storage system, comprising:
a memory resource for storing software instructions; and
a processing resource associated with the memory for
executing the software instructions for:
allocating task control blocks in a memory resource in the
data storage system for implementing a first plurality of
tasks for clearing the meta data in a second plurality of
meta data tracks;
wherein the first plurality is less than the second plurality,
and the second plurality of meta data tracks are associated with a plurality of different hierarchical levels of
storage resources in the data storage system;
implementing throttling and recycling of the task control
blocks at the different hierarchical levels to implement
the first plurality of tasks and clearing the meta data
from the second plurality of meta data tracks.

21. A program storage device, tangibly embodying a
program of instructions executable by a processing resource
in a data storage system to perform a method for clearing
meta data in the data storage system, the method comprising:
allocating task control blocks in a memory resource in the
data storage system for implementing a first plurality of
tasks for clearing the meta data in a second plurality of
meta data tracks;
wherein the first plurality is less than the second plurality,
and the second plurality of meta data tracks are associated with a plurality of different hierarchical levels of
storage resources in the data storage system;
implementing throttling and recycling of the task control
blocks at the different hierarchical levels to implement
the first plurality of tasks and clearing the meta data
from the second plurality of meta data tracks.

22. A method for clearing meta data in a data storage
system, comprising:
determining a number N of task control blocks to be used
for implementing a plurality of tasks for clearing the
meta data;
wherein the meta data is provided in tracks that are
associated with storage resources of the data storage
system, wherein the storage resources are arranged in a
hierarchy including at least a first level and a lower
second level; and
implementing the tasks by allocating a first subset of the
N task control blocks, comprising a first plurality of the
task control blocks, for first tasks for clearing first
tracks of the meta data that are associated with the first
level, and allocating a second subset of the N task
control blocks, comprising a second plurality of the
task control blocks, for second tasks for clearing second tracks of the meta data that are associated with the
second level;
allocating at least a first additional one of the N task
control blocks for implementing a first master task for
coordinating the allocating of the first subset of the N
task control blocks, and reusing of the first task control
blocks as initial ones of the first tasks are completed to
implement subsequent ones of the first tasks; and
allocating at least a second additional one of the N task
control blocks for implementing a second master task
for coordinating the allocating of the second subset of
the N task control blocks, and reusing of the second
task control blocks as initial ones of the second tasks
are completed to implement subsequent ones of the
second tasks;
wherein said first and second allocated subsets clear the
meta data tracks associated with the first level and the
meta data tracks associated with the second level of the
storage resources of the data storage system.

23. A data storage system, comprising:
a memory resource for storing software instructions; and
a processing resource associated with the memory for
executing the software instructions for:
determining a number N of task control blocks to be used
for implementing a plurality of tasks for clearing the
meta data;
wherein the meta data is provided in tracks that are
associated with the storage resources, and the storage
resources are arranged in a hierarchy including at least
a first level and a lower second level; and implementing the tasks by allocating a first subset of the N task control blocks, comprising a first plurality of the task control blocks, for first tasks for clearing first tracks of the meta data that are associated with the first level, and allocating a second subset of the N task control blocks, comprising a second plurality of the task control blocks, for second tasks for clearing second tracks of the meta data that are associated with the second level;

allocating at least a first additional one of the N task control blocks for implementing a first master task for coordinating the allocating of the first subset of the N task control blocks, and reusing of the first task control blocks as initial ones of the first tasks are completed to implement subsequent ones of the first tasks; and allocating at least a second additional one of the N task control blocks for implementing a second master task for coordinating the allocating of the second subset of the N task control blocks, and reusing of the second task control blocks as initial ones of the second tasks are completed to implement subsequent ones of the second tasks;

wherein said first and second allocated subsets clear the meta data tracks associated with the first level and the second level of the storage resources.

24. A program storage device, tangibly embodying a program of instructions executable by a processing resource in a data storage system to perform a method for clearing meta data in the data storage system, the method comprising:

determining a number N of task control blocks to be used for implementing a plurality of tasks for clearing the meta data;

wherein the meta data is provided in tracks that are associated with the storage resources, and the storage resources are arranged in a hierarchy including at least a first level and a lower second level; and implementing the tasks by allocating a first subset of the N task control blocks, comprising a first plurality of the task control blocks, for first tasks for clearing first tracks of the meta data that are associated with the first level, and allocating a second subset of the N task control blocks, comprising a second plurality of the task control blocks, for second tasks for clearing second tracks of the meta data that are associated with the second level;

allocating at least a first additional one of the N task control blocks for implementing a first master task for coordinating the allocating of the first subset of the N task control blocks, and reusing of the first task control blocks as initial ones of the first tasks are completed to implement subsequent ones of the first tasks; and allocating at least a second additional one of the N task control blocks for implementing a second master task for coordinating the allocating of the second subset of the N task control blocks, and reusing of the second task control blocks as initial ones of the second tasks are completed to implement subsequent ones of the second tasks;

wherein said first and second allocated subsets clear the meta data tracks at both the at least first level and the lower second level of the storage resources.

* * * * *